(12) United States Patent
Mimura et al.

(10) Patent No.: US 8,149,350 B2
(45) Date of Patent: Apr. 3, 2012

(54) OPTICAL ELEMENT, AND LIGHTING DEVICE, DISPLAY DEVICE AND ELECTRONIC DEVICE THAT USE THE OPTICAL ELEMENT

(75) Inventors: Koji Mimura, Kawasaki (JP); Ken Sumiyoshi, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 461 days.

(21) Appl. No.: 11/866,543

(22) Filed: Oct. 3, 2007

(65) Prior Publication Data

US 2008/0088905 A1 Apr. 17, 2008

(30) Foreign Application Priority Data

Oct. 13, 2006 (JP) .................. 2006-279994

(51) Int. Cl.
*G02F 1/1335* (2006.01)
*F21V 11/02* (2006.01)
*F21V 11/06* (2006.01)

(52) U.S. Cl. ............ 349/66; 362/290; 362/354

(58) Field of Classification Search ........... 359/558, 359/613; 349/66; 362/290, 354
See application file for complete search history.

(56) References Cited

U.S. PATENT DOCUMENTS

| | | | | |
|---|---|---|---|---|
| 3,907,403 A * | 9/1975 | Maeda | ............. | 385/120 |
| 3,919,559 A | 11/1975 | Stevens | | |
| 4,586,780 A * | 5/1986 | Chern et al. | ............. | 359/294 |
| 5,600,456 A | 2/1997 | Maruyama et al. | | |
| 5,737,040 A | 4/1998 | Ichikawa et al. | | |
| 5,831,765 A | 11/1998 | Nakayama et al. | | |
| 6,185,038 B1 | 2/2001 | Yamaguchi et al. | | |
| 6,449,094 B1 | 9/2002 | Ishii | | |
| 2002/0118452 A1 | 8/2002 | Taniguchi et al. | | |
| 2003/0103177 A1* | 6/2003 | Maeda et al. | ............. | 349/113 |
| 2004/0066383 A1 | 4/2004 | Chen | | |
| 2004/0189612 A1 | 9/2004 | Bottari et al. | | |
| 2004/0263735 A1* | 12/2004 | Kitson et al. | ............. | 349/123 |
| 2005/0007000 A1 | 1/2005 | Chou et al. | | |
| 2005/0253975 A1* | 11/2005 | Watanabe | ............. | 349/10 |
| 2006/0256415 A1* | 11/2006 | Holmes et al. | ............. | 359/28 |
| 2006/0291243 A1 | 12/2006 | Niioka et al. | | |
| 2008/0144179 A1 | 6/2008 | Mimura et al. | | |

FOREIGN PATENT DOCUMENTS

CN 1336995 A 2/2002
(Continued)

OTHER PUBLICATIONS

Japanese Office Action for JP Application 2006-27994 dated Jul. 7, 2011, With Enlgish Translation.

(Continued)

*Primary Examiner* — Alessandro Amari
*Assistant Examiner* — Kimberly N Kakalec
(74) *Attorney, Agent, or Firm* — Sughrue Mion, PLLC (57) ABSTRACT

A micro-louver (1) includes: a transparent substrate (2); a concavoconvex shape portion (5) formed on at least one surface of the transparent substrate (2) and in a prescribed pattern for diffracting incident light to form an image; and a light controlling layer (7) including at least one transparent layer (3) and at least light-absorption layer (4) arranged alternately on said at least one surface of the transparent substrate (2), each of said at least one transparent layer (3) and said at least one transparent layer (4) extending in a direction that intersects said at least one surface of the transparent substrate (2).

1 Claim, 7 Drawing Sheets

FOREIGN PATENT DOCUMENTS

| | | |
|---|---|---|
| JP | 50-92751 | 7/1975 |
| JP | 10-197844 A1 | 7/1998 |
| JP | 11133233 A | 5/1999 |
| JP | 11133234 A | 5/1999 |
| JP | 11-285705 A | 10/1999 |
| JP | 11-295705 A | 10/1999 |
| JP | 2000137294 A | 5/2000 |
| JP | 200271912 A | 3/2002 |
| JP | 3085227 U | 4/2002 |
| JP | 2003131202 A | 5/2003 |
| JP | 2004029673 A | 1/2004 |
| JP | 2004-117574 A | 4/2004 |
| JP | 200562208 A | 3/2005 |
| JP | 2005266215 A | 9/2005 |
| JP | 2005275262 A | 10/2005 |
| JP | 2006140126 A | 6/2006 |
| JP | 2006277999 A | 10/2006 |
| JP | 2006323052 A | 11/2006 |
| JP | 2007010716 A | 1/2007 |
| JP | 2007052094 A | 3/2007 |
| WO | 01/36865 A1 | 5/2001 |
| WO | 2005116723 A1 | 12/2005 |
| WO | 2006076399 A1 | 7/2006 |

OTHER PUBLICATIONS

U.S. Non-Final Office Action issued Nov. 14, 2011 in corresponding U.S. Appl. No. 11/866,763.

Office Action dated Dec. 20, 2011 from the USPTO in counterpart U.S. Appl. No. 13/242,251.

* cited by examiner

OPTICAL ELEMENT, AND LIGHTING DEVICE, DISPLAY DEVICE AND ELECTRONIC DEVICE THAT USE THE OPTICAL ELEMENT

BACKGROUND OF THE INVENTION

1. Field of the Invention

The present invention relates to an optical element that limits the progression of light in directions that are oblique with respect to a surface, and to a lighting device, a display device and an electronic device that use this optical element.

2. Description of the Related Art

It is in some cases desirable that persons other than the user of a display device are not able to view the display screen. For this purpose, an optical element in the form of film for limiting the progression of light in directions oblique to the surface is known, and such an optical element is referred to as a "micro-louver."

Figure 1:
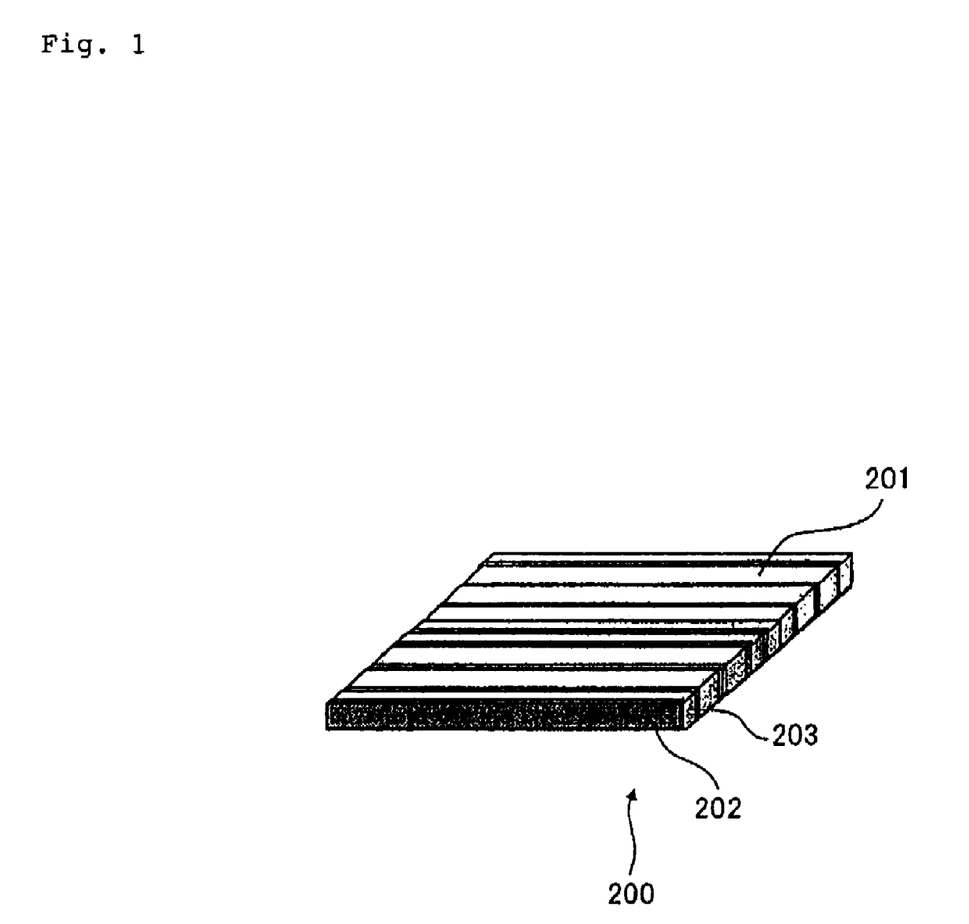
FIG. 1 is a perspective view showing a micro-louver of an example of the related art.

As shown in the publication JP-A-S50-092751 of FIG. 1, relevant micro-louver 200 has a structure in which each of light-absorption portions 202 and each of transparent portions 203 are alternately laminated, each of the portions 202 and 203 extending perpendicular to surface 201. This micro-louver 200 is arranged on a display surface of a display device, and the light, which is emitted in an oblique direction to the display surface, is limited, such that a display image cannot be viewed from the oblique direction to the display surface.

SUMMARY OF THE INVENTION

The angle region that is laterally oblique to surface 201 of micro-louver 200 as described hereinabove is the region in which light is not emitted in relevant micro-louver 200. This angle region in which light is not emitted can conceivably be used for the display of images such as for advertising and that differ from the original image that is wished to be blocked from view.

It is therefore an object of the present invention to, in an optical element that limits the emission of light to an angle region that is laterally oblique to the surface, enable the use of the angle region in which the emission of light is limited for the display of images.

The optical element of the present invention for achieving the above-described object includes: a transparent substrate; a concavoconvex shape portion formed on at least one surface of the transparent substrate and in a prescribed pattern for diffracting incident light to form an image; and a light controlling layer including at least one transparent portion and at least light-absorption portion arranged alternately on said at least one surface of the transparent substrate, each of said at least one transparent portion and said at least one light-absorption extending in a direction that intersects said at least one surface of the transparent substrate.

According to the optical element of the present invention, the light-absorption portions limit the emission of oblique light to the surface of the transparent substrate. The optical element of the present invention further allows the display of a diffraction image formed by a concavoconvex shape portion in the angle region in which the emission of light is limited.

DETAILED DESCRIPTION OF EXEMPLARY EMBODIMENTS

Hereinafter, exemplary embodiments of the present invention will be explained with reference to the accompanying drawings below.

Figure 2:
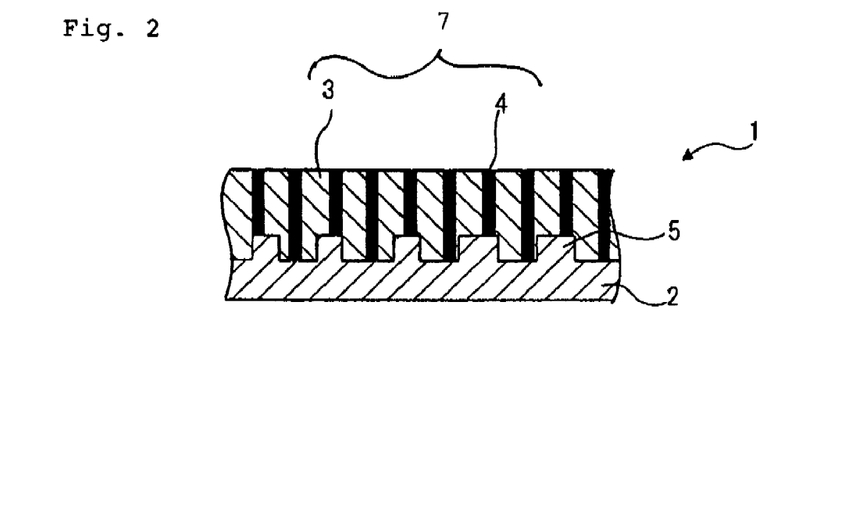
FIG. 2 is a sectional view in the direction of thickness giving a schematic representation of a micro-louver of an embodiment of the present invention.

FIG. 2 shows a sectional view in the direction of thickness of micro-louver 1 of an embodiment of the present invention. Additionally, in the interest of simplifying explanation, only a few of transparent portions 3, light-absorption portions 4, and the concave portions and convex portions of concavoconvex shape portion 5 are shown in FIG. 2. However, these components are actually minute in size and are arranged in a multiplicity on transparent substrate 2. This simplification also applies to the other figures.

Micro-louver 1 of the present embodiment includes transparent substrate 2. Concavoconvex shape portion 5 is formed in a prescribed pattern on one surface of transparent substrate 2. This concavoconvex shape portion 5 constitutes a transmissive-type diffraction grating that generates a prescribed diffraction image. Light controlling layer 7 is further formed on the surface of transparent substrate 2 on which concavoconvex shape portion 5 is formed. Light controlling layer 7 includes transparent portions 3 and light-absorption portions 4 that extend perpendicular to the surface of transparent substrate 2. In the example shown in FIG. 2, transparent portions 3 and light-absorption portions 4 are alternately arranged in the right-left direction of the figure. Although not shown in detail, transparent portions 3 and light-absorption portions 4 may also be formed so as to include a prescribed planar pattern such as a grid.

Figure 3:
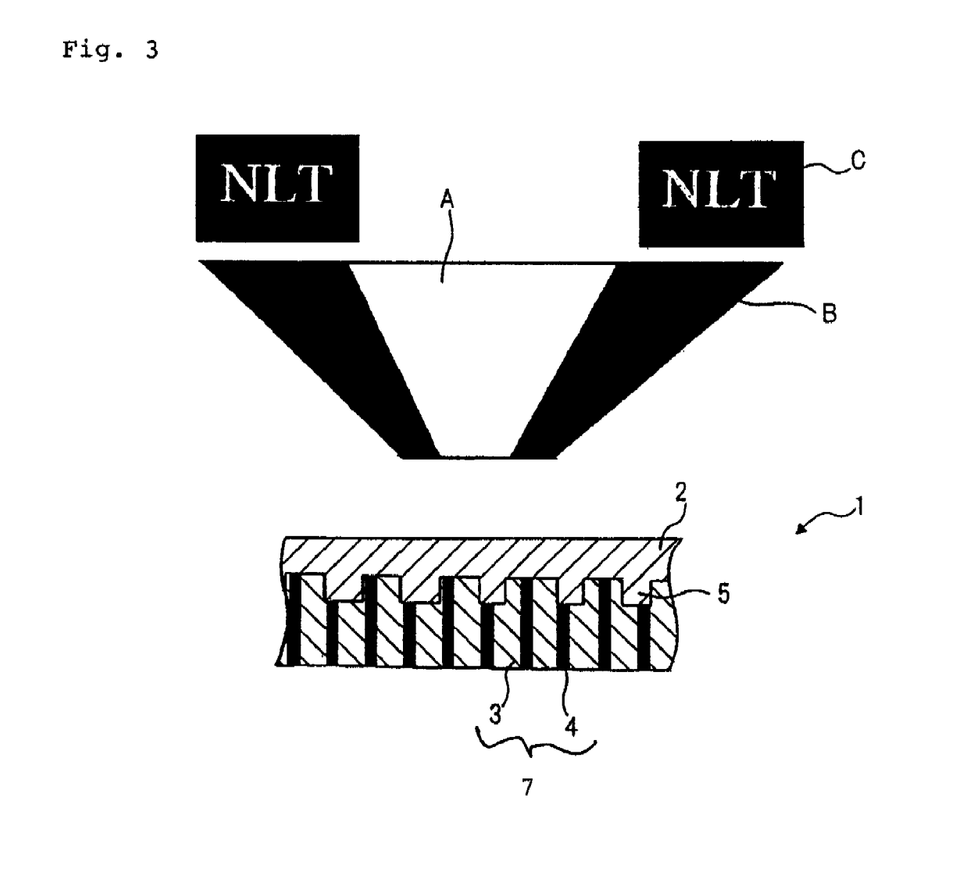
FIG. 3 is an explanatory view for explaining the operation realized by the micro-louver of FIG. 2.

This micro-louver 1 is intended for irradiating light over the surface that is on the side opposite to the side of transparent substrate 2 on which concavoconvex shape portion 5 is formed. At this time, as shown in FIG. 3, light, which is incident to micro-louver 1 in the angle region A that is close to being perpendicular to the surface of micro-louver 1, is transmitted and emitted. On the other hand, light in the angle region B, in which the angle with respect to the surface of micro-louver 1 is small, is blocked by light-absorption portions 4, whereby the light emitted from micro-louver 1 is limited.

Furthermore, a part of the light that passes through the region of micro-louver 1 in which transparent portions 3 are formed and reaches concavoconvex shape portion 5 is diffracted in concavoconvex shape portion 5, whereby a diffraction image that accords with the prescribed pattern is formed. The light that forms this diffraction image is not blocked by light-absorption portions 4 and is therefore emitted to the angle region B. As a result, a fixed image C that corresponds to the diffraction image is visible to an observer located in the angle region B.

In this way, micro-louver 1 of the present embodiment enables the use of angle region B, in which the emission of light is limited, for the display of fixed image C. In addition, light that forms a diffraction image can also be considered to be output to angle region A. However, light that has passed through micro-louver 1 is dominant in angle region A, so that the diffraction image does not stand out.

Figure 4:
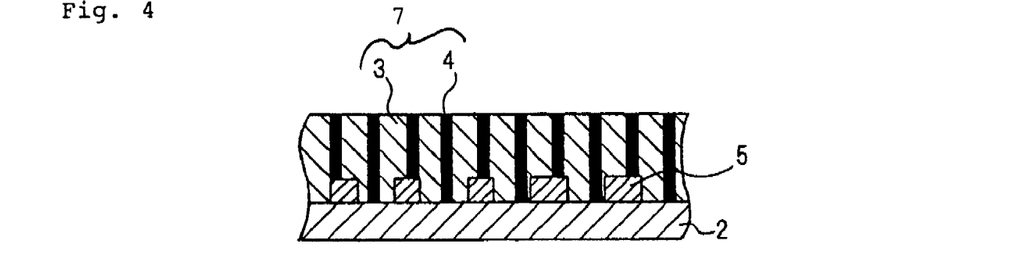
FIG. 4 is a sectional view showing a modification of the micro-louver of FIG. 2.

In micro-louver 1 of the present embodiment, concavoconvex shape portion 5 can be formed by, for example, using a resin part as transparent substrate 2 and then pressing by a die. Alternatively, concavoconvex shape portion 5 may be formed by a different member on the surface of transparent substrate 2, as shown in FIG. 4. Concavoconvex shape portion 5 that is realized by the different member can be formed by utilizing, for example, photolithographic techniques.

The concavoconvex pitch in concavoconvex shape portion 5 that constitutes a diffraction grating in the present embodiment can be on the order of, for example, 0.5 µm-2 µm, and the concavoconvex difference can be set to the order of 0.1 µm-1 µm. In this case, if the angle of emission of transmitted diffraction light is θt, the angle of incidence of incident light is θi, the diffraction order is m, the wavelength of incident light is λ, and the concavoconvex pitch is p, these values should satisfy the diffraction formula:

$$\sin \theta t - \sin \theta i = m\lambda/p$$

Transparent portions 3 and light-absorption portions 4 can be formed using, for example, photolithographic techniques. Namely, transparent resin that is to serve as transparent portions 3 is, for example, applied to transparent substrate 2, and this transparent resin is then patterned by photolithographic techniques. Then, regions of transparent layer 3 that have been removed by the patterning are then filled with the material that is to serve as light-absorption portions 4, whereby transparent portions 3 and light-absorption portions 4 of a prescribed pattern can be obtained.

At this time, the angle region in which the emission of light is limited by micro-louver 1 can be widened according to the thickness of light-absorption portions 4 and the narrowness of the formation spacing of light-absorption portions 4. Here, in order to form light-absorption portions 4 at a practical formation spacing so as to obtain micro-louver 1 having a sufficiently broad angle region in which the emission of light is limited, light-absorption portions 4 are preferably formed with sufficient thicknesses. Therefore, a chemically amplified negative photoresist manufactured by the MicroChem Corporation is preferably used as the material of transparent portions 3. This resist has a relatively small molecular weight before exposure to light, and thus is extremely soluble in a solvent of cyclopentanone, propylene glycol methyl ether acetate (PEGMEA), gamma butyrolactone (GBL), or isobutyl ketone (MIBK), whereby the formation of a thick film is facilitated and a film can be formed to a thickness of 100-200 µm. The formation spacing of light-absorption portions 4 is on the order of several tens of micrometers.

A UV-hardening, heat-hardening, or UV/heat-hardening resin to which a coloring material such as a pigment has been added can be used as the material of light-absorption portions 4. Here, a black pigment is basically used as the pigment, but depending on the use, a colored pigment or lame may also be used.

Figure 5:
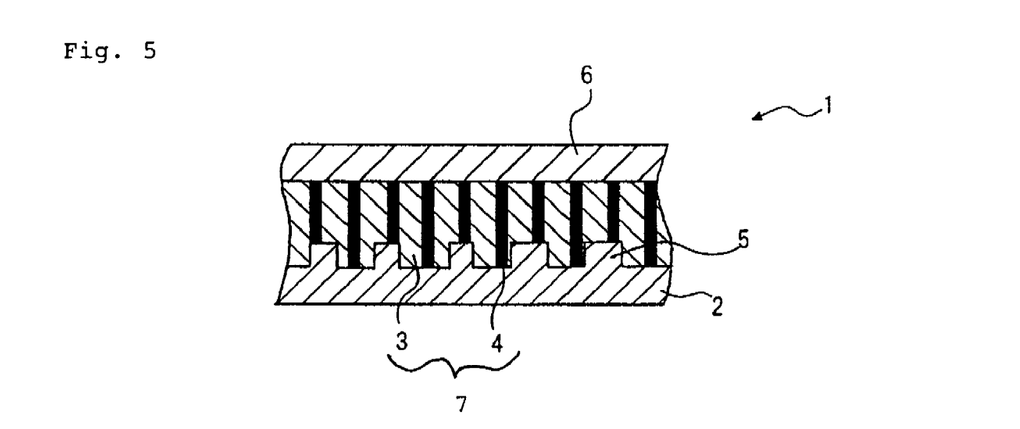
FIG. 5 is a sectional view showing another modification of the micro-louver of FIG. 2.

As shown in FIG. 5, micro-louver 1 may be configured in which another transparent substrate 6 is bonded to the side of light controlling layer 7 opposite to the side on which concavoconvex shape portion 5 is formed. In this case, a structure is formed in which transparent portions 3 having a prescribed pattern are sandwiched by transparent substrate 2 and transparent substrate 6. Light-absorption portions 4 of this structure can be formed using a method in which the capillary phenomenon is utilized to fill micro-holes formed between transparent substrate 2 and transparent substrate 6 with the material of light-absorption portions 4.

Figure 6:
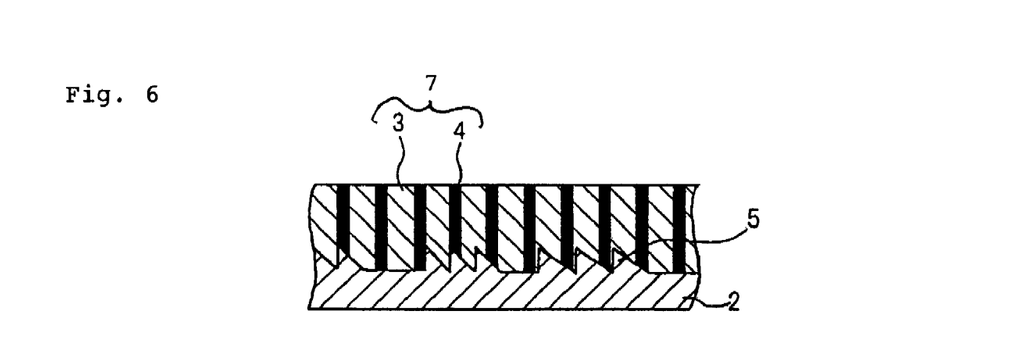
FIG. 6 is a schematic view showing yet another modification of the micro-louver of FIG. 2.

Here, FIGS. 2 to 5 show a laminar diffraction grating as concavoconvex shape portion 5. However, the diffraction grating of the present invention is not limited to this laminar type, and a blazed diffraction grating may also be configured as shown in FIG. 6.

Further, although a structure has been shown in the present embodiment in which concavoconvex shape portion 5 is formed on the surface of transparent substrate 2 on the side on which transparent portions 3 and light-absorption portions 4 have been provided, a configuration is also possible in which concavoconvex shape portion 5 is formed on the surface on the opposite side. In a configuration in which transparent portions 3 and concavoconvex shape portion 5 are formed on the same surface of transparent substrate 2, diffraction is effectively generated by concavoconvex shape portion 5 and a diffraction image is effectively formed. Accordingly, transparent portions 3 and concavoconvex shape portion 5 are preferably constituted by members that have sufficient difference in indices of refraction.

(Example of Application to a First Lighting Device)

Figure 7:
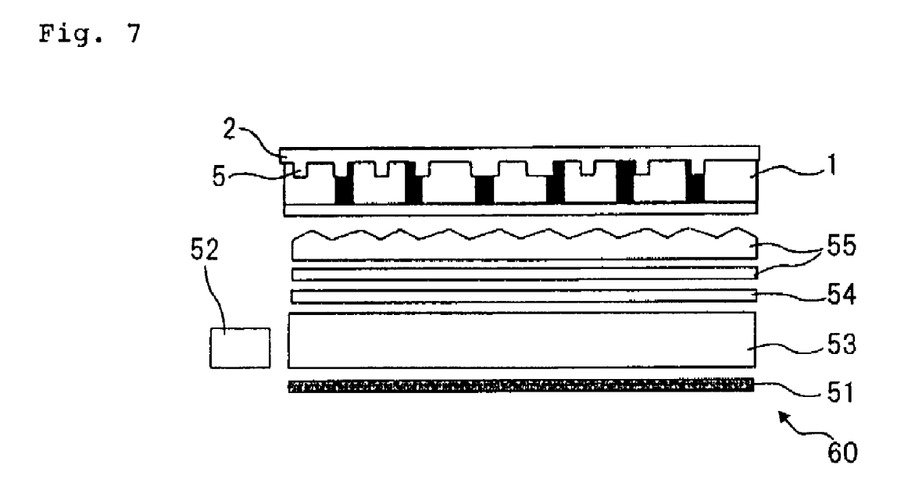
FIG. 7 is a schematic view showing a first example of lighting device that incorporates the micro-louver of the present invention.

Referring to FIG. 7, explanation next regards one example of first lighting device 60 on which micro-louver 1 of the present invention is mounted. FIG. 7 is a side view showing a schematic view of lighting device 60. FIG. 7 shows the major parts of lighting device 60, and details of, for example, the frame that supports each of the parts shown in the figure have been omitted from the drawing.

Lighting device 60 is of a configuration that includes reflection sheet 51 in the lowest portion of the figure and that, by reflection sheet 51, reflects light from light source 52 that is arranged obliquely upward on reflection sheet 51 so as to irradiate from the irradiation surface of the upper end of the figure. Light guide plate 53 and diffusion plate 54 are arranged in order over reflection sheet 51. Light that has been reflected by reflection sheet 51 is scattered by diffusion plate 54, whereby the amount of irradiated light is equalized over the entire surface of the irradiation surface. Prism sheet 55 is arranged over diffusion plate 54 and serves the role of adjusting to a certain degree the directionalities of light that has been scattered by diffusion plate 54. Micro-louver 1 is mounted over this prism sheet 55.

Micro-louver 1 is arranged with the side of transparent substrate 2 on which concavoconvex shape portion 5 is formed facing upward. Accordingly, light source 52, reflection sheet 51, light guide plate 53, diffusion plate 54, and prism sheet 55 make up a light source device that irradiates light over the entire surface of micro-louver 1 of the side opposite to the side of transparent substrate 2 on which concavoconvex shape portion 5 is formed.

By mounting micro-louver 1, lighting device 60 is obtained having directivity in which the quantity of light in directions oblique to the light irradiation surface is limited. Moreover, a fixed image can be displayed in the angle region in which the amount of light is limited. This fixed image can be used for, for example, advertising.

Figure 8:
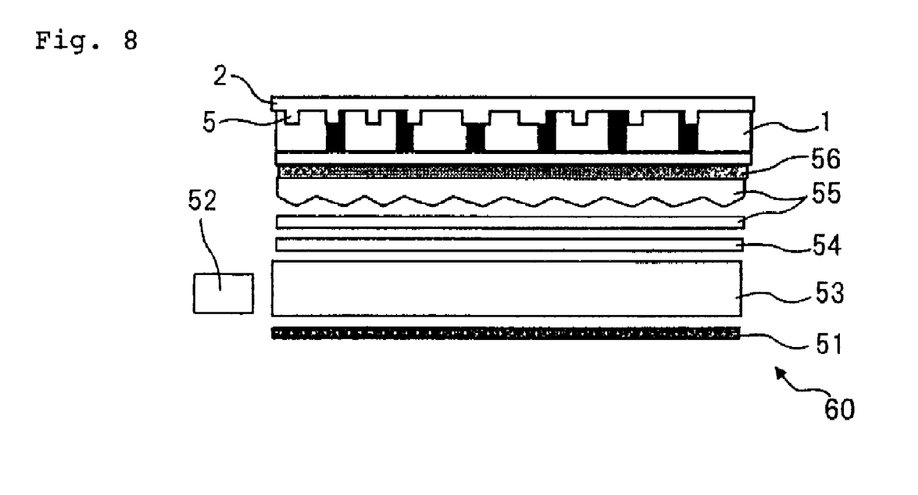
FIG. 8 is a schematic view showing a modification of the lighting device of FIG. 7.

As shown in FIG. 8, micro-louver 1 may be adhered to prism sheet 55 via transparent adhesive layer 56, whereby the reflection of light at the interface of micro-louver 1 and prism sheet 55 can be reduced and the loss of a quantity of light due to reflection can be decreased.

(Example of Application to a Second Lighting Device)

Figure 9:
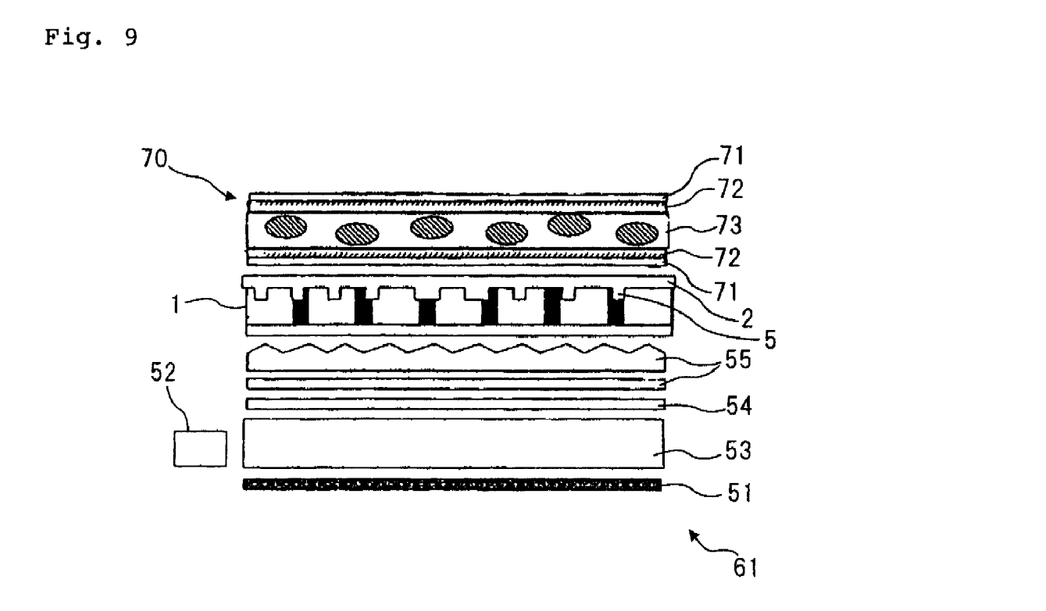
FIG. 9 is a schematic view showing a second example of lighting device that incorporates the micro-louver of the present invention.

Referring to FIG. 9, explanation next regards second lighting device 61 on which micro-louver 1 of the present invention is mounted. This lighting device 61 is a device in which first lighting device 60 is further provided with a transmission-scattering switching element (PDLC: Polymer Dispersed Liquid Crystal) 70 on the light emission side (upper side of the figure) of micro-louver 1.

Transmission-scattering switching element 70 includes a polymer-dispersed liquid crystal layer 73. Although detailed explanation is omitted, switching of the voltage applied to transparent electrodes 72, each of which is fitted on the both surfaces of polymer-dispersed liquid crystal layer 73, can bring about switching between a state in which incident light is scattered and a state in which incident light is transmitted. Transmission-scattering switching element 70 shown in the figure further includes transparent substrates 71 arranged on the outer side of each of transparent electrodes 72.

In this lighting device 61, the combination of micro-louver 1 and transmission-scattering switching element 70 enables switching between a state having directivity and a state lacking directivity. In other words, when transmission-scattering switching element 70 is switched to a state in which incident light is transmitted, illumination having directivity can be obtained by the operation of micro-louver 1, as in the case of lighting device 50. On the other hand, when transmission-scattering switching element 70 is switched to a state in which incident light is scattered, although light emitted from micro-louver 1 has directivity, this emitted light is scattered by transmission-scattering switching element 70, thereby losing the directivity. The output from lighting device 61 is therefore illumination lacking directivity.

In this lighting device 61, the incorporation of micro-louver 1 of the present invention enables the display of a fixed image in the angle region in which the emission of light is limited when transmission-scattering switching element 70 is switched to a state in which incident light is transmitted.

Figure 10:
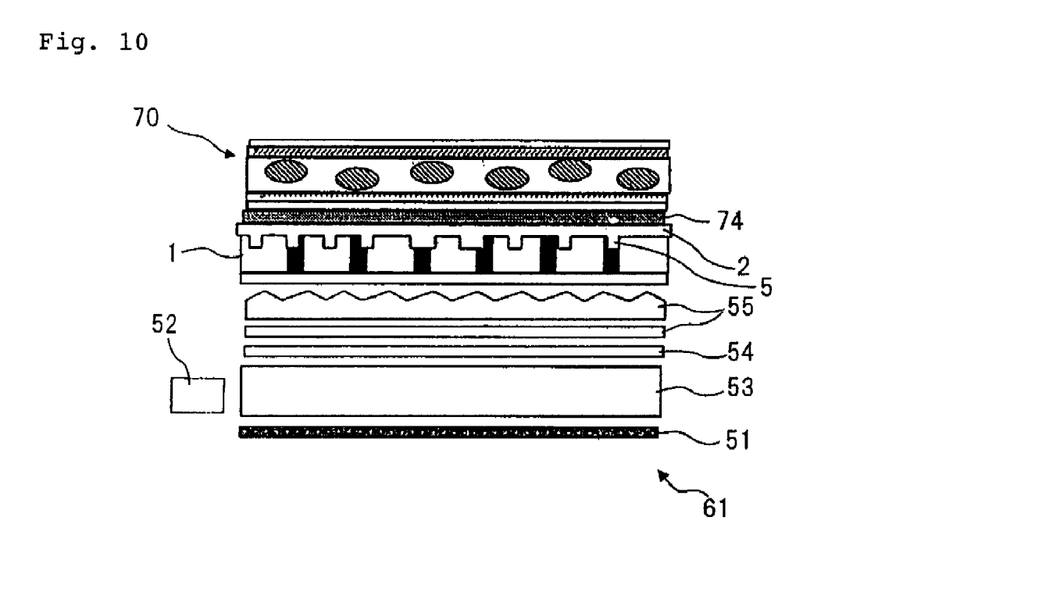
FIG. 10 is a schematic view showing a modification of the lighting device of FIG. 9.

In addition, as shown in FIG. 10, micro-louver 1 may also be adhered to transmission-scattering switching element 70 via transparent adhesive layer 74, whereby the reflection of light at the interface of micro-louver 1 and transmission-scattering switching element 70 can be reduced, and the loss of an amount of light due to reflection can be decreased.

(Example of Application to a First Display Device)

Figure 11:
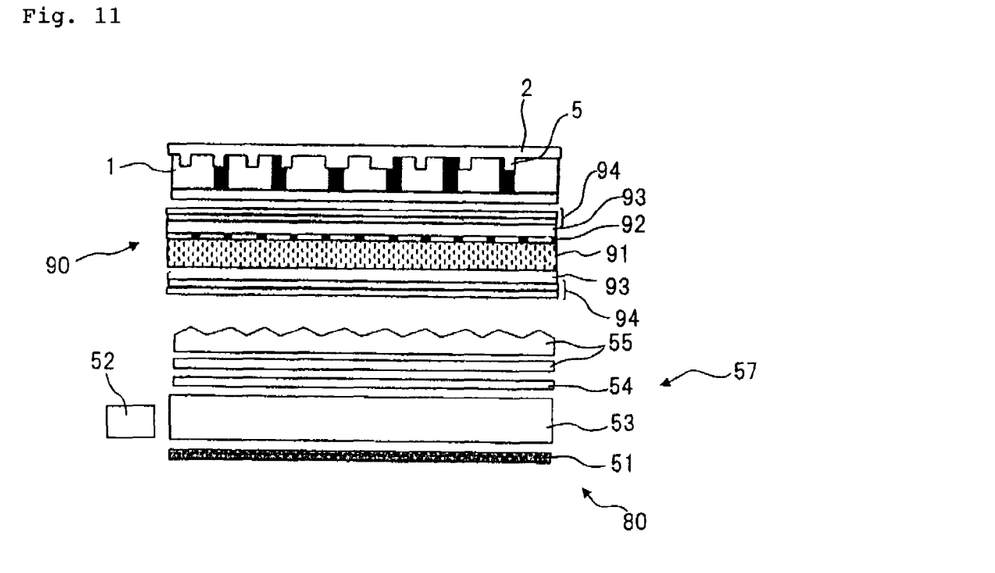
FIG. 11 is a schematic view showing a first display device that is one example of the incorporation of the micro-louver of the present invention.

Referring to FIG. 11, explanation next regards an example of first display device 80 on which micro-louver 1 of the present invention is mounted. LCD (Liquid Crystal Display) is used as the optical control element of this display device 80.

With the exception that micro-louver 1 is not arranged, a device of a configuration similar to the above-described first lighting device 60 is used as backlight device 57 of liquid crystal display panel 90. In FIG. 11, the reference numbers conferred to the constituent components of backlight device 57 are the same as ones in lighting device 60, and detailed explanation is therefore omitted.

Liquid crystal display panel 90 includes liquid crystal layer 91 and color filter 92 provided on the display surface side (the upper side of the figure) of liquid crystal layer 91 for enabling the display of a color image. Liquid crystal layer 91 and color filter 92 are supported by transparent substrates 93 arranged on the obverse and reverse (on both the upper and lower sides in the figure), and polarizer/retarder plate 94 are arranged on the outer side of each of transparent substrates 93.

Micro-louver 1 is arranged on the display surface side of liquid crystal display panel 90 such that transparent substrate 2 on which concavoconvex shape portion 5 is formed is directed toward the display side (upward in the figure). In this way, the amount of light, which is in a direction oblique to the display surface in the light that is emitted via liquid crystal display panel 90 from backlight device 57, is limited. As a result, the ability to see a display image from a direction oblique to the display surface can be restricted, i.e., the visible angle range of display device 80 can be limited.

Furthermore, a fixed image formed by concavoconvex shape portion 5 of micro-louver 1 can be made visible from the angle region outside this visible angle range of display device 80. For example, although the display image produced by liquid crystal display panel 90 becomes dim and hard to see in the angle region close to the boundaries between angle region A of micro-louver 1 in which light is emitted and angle region B in which the emission of light is limited (see FIG. 3), the display image may still be somewhat visible in some cases. When the fixed image produced by concavoconvex shape portion 5 is displayed in such cases, this fixed image is displayed more brightly than the display image produced by liquid crystal display panel 90, so that an observer more easily recognizes the fixed image. Thus, even when the display image produced by liquid crystal display panel 90 is dimly displayed, the ability to view the display image can be effectively restricted by the display of the fixed image.

In addition, liquid crystal display panel 90 is not limited to the transmission type, and although other components such as backlight device 57 may require alteration as appropriate, a transflective type or a reflective type may also be used. In such cases, micro-louver 1 is arranged on the display surface side of liquid crystal display panel 90, thereby obtaining the operation of limiting the visible angle range. Other optical control elements of light-emission type such as an organic EL (Organic Electroluminescence) display panel or PDP (Plasma Display Panel) may also be employed. In addition, a configuration may be adopted in which micro-louver 1 is adhered to the display surface of an optical control element. Alternatively, micro-louver 1 may be supplied separately from display device 80 and may be of a configuration such that the user adheres micro-louver 1 to the display surface of an existing display device. Still further, configurations are also possible in which a hard-coat layer as a measure for protecting against scratches or a anti-reflection film is added to the observer-side surface of micro-louver 1 to restrict that the display is made hard to see by providing micro-louver 1.

Display device 80 can be preferably used for, for example, a cellular phone or a portable computer such as a notebook PC. This use of micro-louver 1 in a portable electronic device can prevent the display screen from being viewed by others and can maintain the protection of privacy when the device is carried and used outside. Even in the case of a fixed electronic device, micro-louver 1 can be applied to, for example, a terminal for the input and output of information for which secrecy is required, thereby raising security.

(Example of Application to a Second Display Device)

Figure 12:
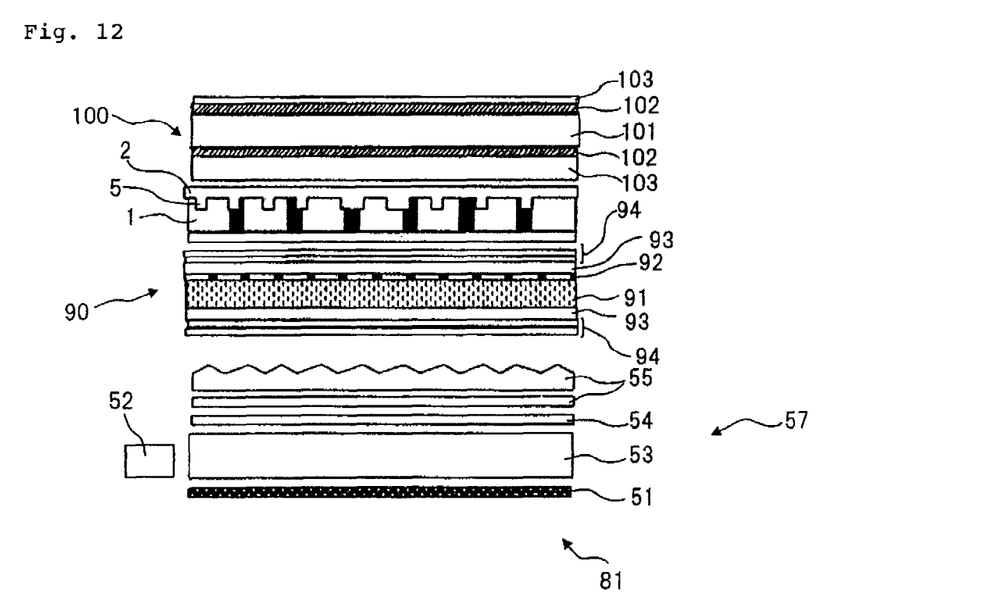
FIG. 12 is a schematic view showing a second display device that incorporates the micro-louver of the present invention.

Referring to FIG. 12, explanation next regards second display device 81 on which micro-louver 1 of the present invention is mounted. This display device 81 is a device in which first display device 80 is further provided with touch panel 100 arranged on the surface of the display screen. The other constituent components of display device 81 are similar to those of first display device 80 and the same reference numbers are therefore applied, and detailed explanation is omitted.

Touch panel 100 is a device that detects the position on a screen touched by a person's finger or stylus dedicated for this purpose, and may be of any publicly known configuration. In the example shown in FIG. 12, touch panel 100 includes functional layer 101, transparent electrodes 102 and transparent substrates 103 on and over each of the obverse and reverse of functional layer 101, respectively.

In display device 81, micro-louver 1 is arranged between liquid crystal display panel 90 and touch panel 100. Micro-louver 1 is arranged such that transparent substrate 2 on which concavoconvex shape portion 5 is formed is directed toward the side of touch panel 100, i.e., the display side. This micro-louver 1 obtains the operation of limiting the visible angle range. In this case, a fixed image formed by concavoconvex shape portion 5 of micro-louver 1 can be made visible from angle regions outside the visible angle range of display device 81.

Figure 13:
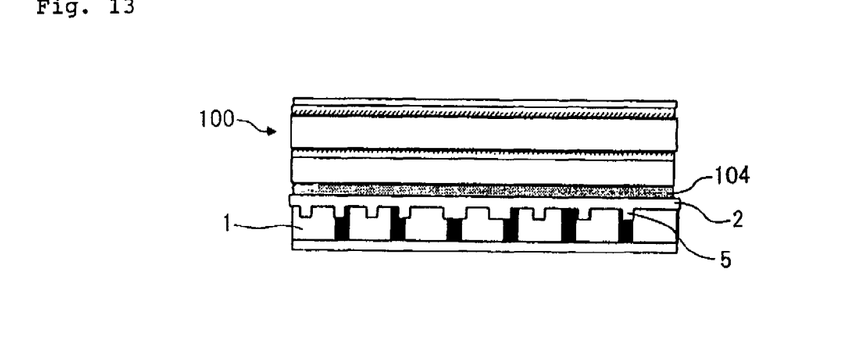
FIG. 13 is a schematic view showing a modification of FIG. 12.
Figure 14:
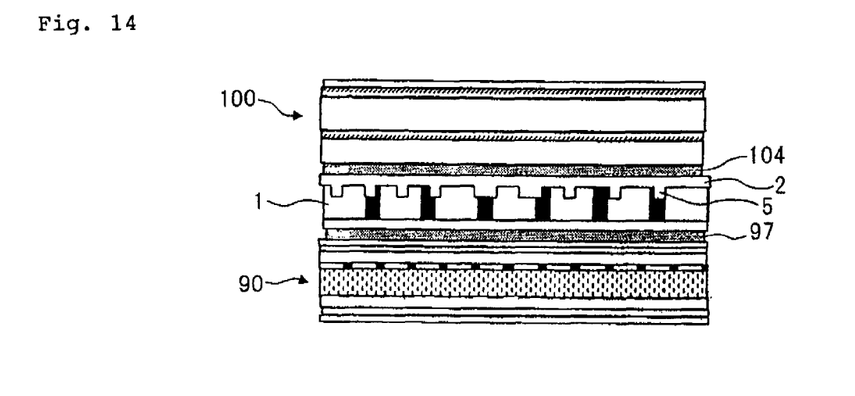
FIG. 14 is a schematic view showing another modification of FIG. 12.

As shown in FIG. 13, micro-louver 1 and touch panel 100 may be adhered together via transparent adhesive layer 104. As a result, the loss of light amount due to surface reflection can be reduced. Further, as shown in FIG. 14, micro-louver 1 and liquid crystal display panel 90 can be adhered together via transparent adhesive layer 97. In addition to the operation of decreasing loss of an amount of light, this adhesion obtains the operation of suppressing the introduction of extraneous matter between touch panel 100 and liquid crystal display panel 90.

Figure 15:
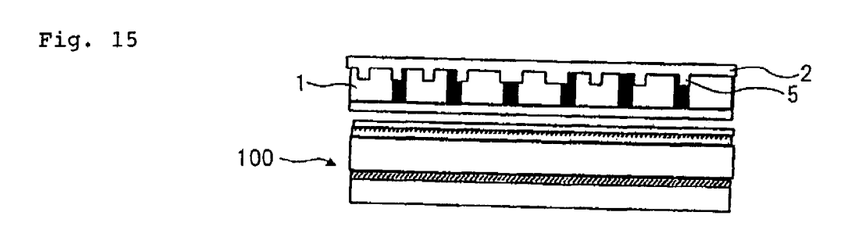
FIG. 15 is a schematic view showing yet another modification of FIG. 12.
Figure 16:
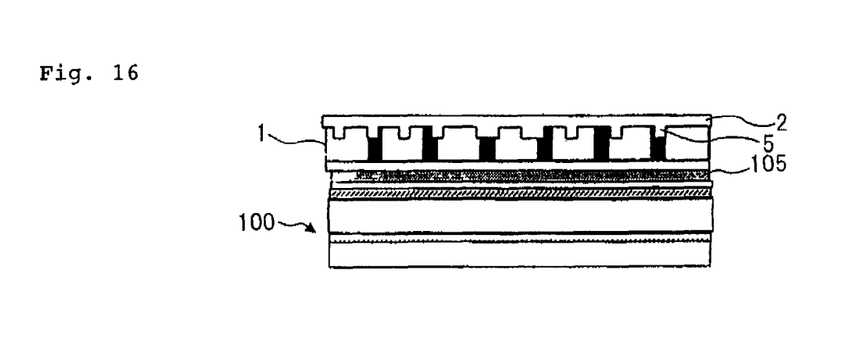
FIG. 16 is a schematic view showing still another modification of FIG. 12.

Further, as shown in FIG. 15, micro-louver 1 may be arranged on the surface of touch panel 100, or may be adhered via transparent adhesive layer 105 as shown in FIG. 16.

Display device 81 can be preferably used in, for example, an ATM (Automated Teller Machine) terminal. The use of display device 81 in an ATM terminal can prevent the display screen from being viewed by persons other than the user of the ATM terminal, who are located directly in front of the display screen, and can thus increase security. In addition, the fixed image formed by concavoconvex shape portion 5 can be made visible to persons located around an ATM terminal, whereby this fixed image can be used for, for example, advertising. Moreover, as previously described, when using an ATM terminal, the display of the fixed image can render the original display screen hard to be recognized by persons other than the user, thereby enabling to achieve an increase in security.

This application is based upon and claims the benefit of priority from Japanese Patent Application No. 2006-279994, filed on Oct. 13, 2006, the disclosure of which is expressly incorporated herein in its entirety by reference.

While exemplary embodiments of the present invention have been described using specific terms, such description is for illustrative purposes. It is to be understood that the invention is not limited to exemplary embodiments or constructions. To the contrary, the invention is intended to cover various modifications and equivalent arrangements. In addition, while the various elements of exemplary embodiments are shown in various combinations and configurations, which are exemplary, other combinations and configurations, including more, less or only a single element, are also within the spirit and scope of the invention as defined in the following claims.

What is claimed is:

1. A display device comprising:
   (a) an optical element comprising:
      a transparent substrate,
      a concavoconvex shape portion formed on at least one surface of the transparent substrate and in a prescribed patter for diffracting incident light to form an image, and
      a light controlling layer including at least one transparent portion and at least one light-absorption portion arranged alternately on said at least one surface of the transparent substrate, each of said at least one transparent portion and said at least one light-absorption portion extending perpendicular to said at least one surface; and
   (b) an optical control element for forming a display image, wherein the optical element is arranged on a display surface of the optical control element such that a surface of the optical element, which is on a side opposite to a side of the transparent substrate on which the concavoconvex shape portion is formed, faces the optical control element, and
   further comprising a touch panel, wherein the touch panel is arranged between the optical control element and the optical element.

* * * * *